United States Patent [19]
Willy

[11] 3,860,371
[45] Jan. 14, 1975

[54] MANUFACTURE OF FOAM FILLED SHEET PRODUCTS

[75] Inventor: John Willy, Attleboro, Mass.

[73] Assignee: Specialty Converters, Inc., Newark, Del.

[22] Filed: Oct. 23, 1973

[21] Appl. No.: 408,405

Related U.S. Application Data

[60] Continuation of Ser. No. 104,012, Jan. 5, 1971, abandoned, which is a division of Ser. No. 845,115, June 6, 1969, Pat. No. 3,617,594, which is a division of Ser. No. 460,929, June 3, 1965, abandoned.

[52] U.S. Cl. ................ 425/115, 264/47, 425/224, 425/817 C
[51] Int. Cl. ............................................. B29d 27/04
[58] Field of Search ........ 425/4 C, 817 C, 115, 130, 425/223, 224, 329, 371, 372, 471; 264/47

[56] References Cited
UNITED STATES PATENTS

| | | | |
|---|---|---|---|
| 3,050,427 | 8/1962 | Slayter et al. | 264/47 X |
| 3,061,496 | 10/1962 | Meyer | 425/115 X |
| 3,240,846 | 3/1966 | Voelker | 425/817 C X |
| 3,681,157 | 8/1972 | Smock | 425/115 X |

*Primary Examiner*—R. Spencer Annear
*Assistant Examiner*—Mark Rosenbaum
*Attorney, Agent, or Firm*—Pennie & Edmonds

[57] ABSTRACT

A foam making apparatus for continuously casting reinforced foam sheets along a moving surface is disclosed. The apparatus includes feeding means for dispensing a foaming mixture carrier. A compacted batting material of non-woven, discontinuous fibers which are randomly oriented in a multidirectional pattern is conveyed to said dispensing means on said surface. Said foaming means is dispensed on said batting material and compressed into the same as an incident of passage through the nip of a pair of rollers. The apparatus also includes a compression control device which receives the foam and compressed batting fill. The compression control device is defined by a pair of plates extending above and below the carrier and having the upper plate fixed horizontally but freely movable vertically. The device further has an air pressure means positioned above the freely movable plate for maintaining a sufficient pressure on the mixture filled batting to prevent expansion of the batting but permitting at the same time expansion of the foam mixture while in the device so that the foam expands in situ to form a substantially uniform cross-sectional reinforced foam-filled product.

5 Claims, 4 Drawing Figures

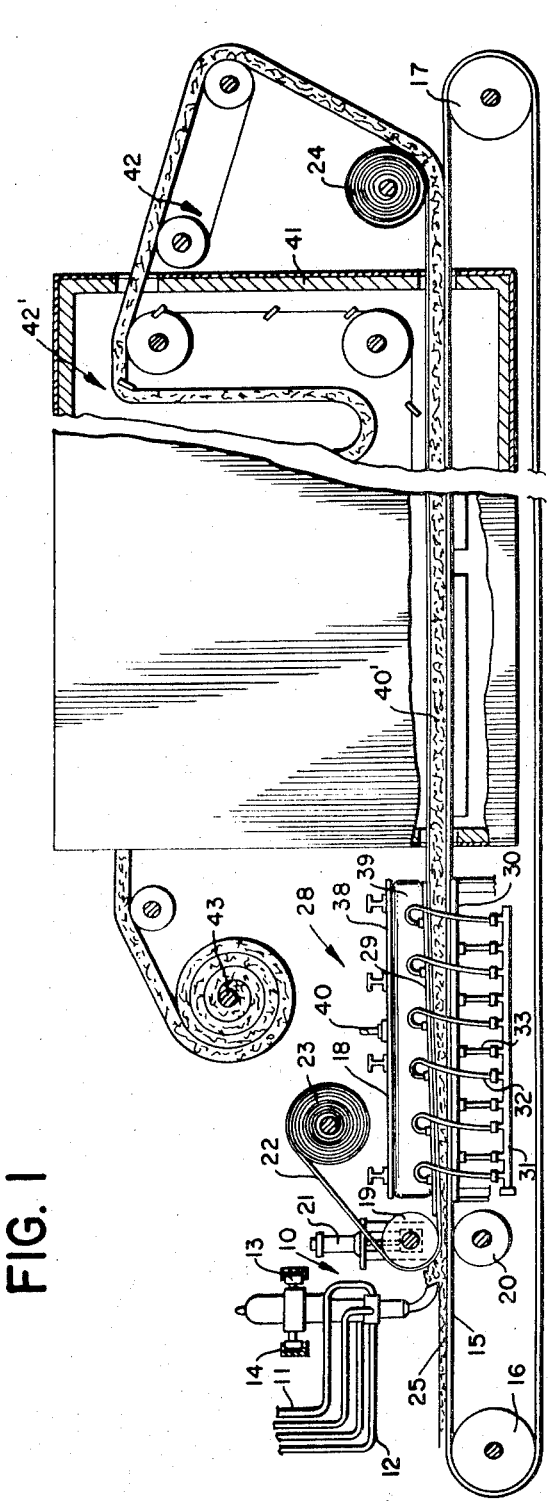
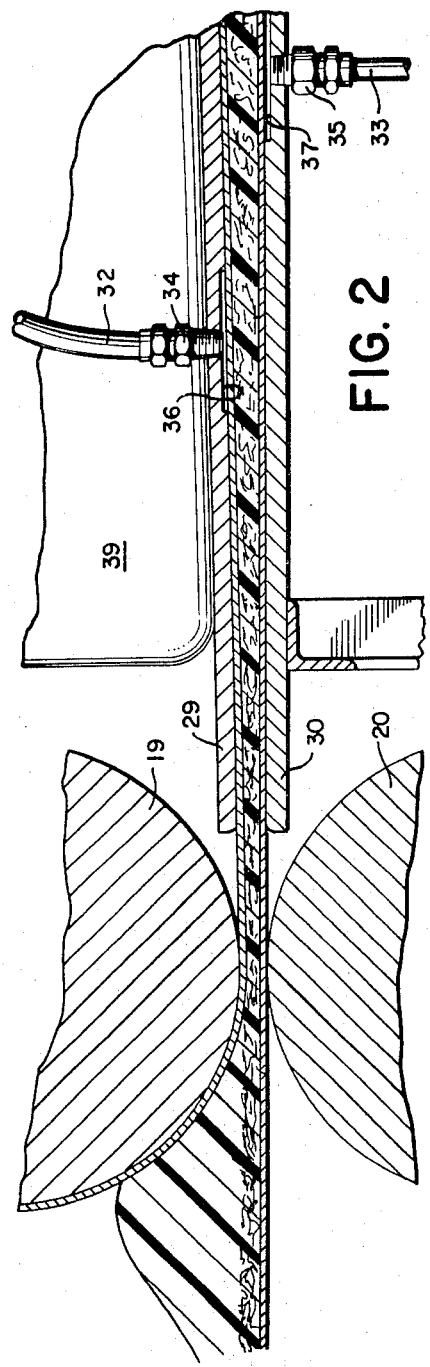

MANUFACTURE OF FOAM FILLED SHEET PRODUCTS

This is a continuation, of application Ser. No. 104,012, filed Jan. 5, 1971, now abandoned, which in turn is a division of application Ser. No. 845,115, filed June 6, 1969, now U.S. Pat. No. 3,617,594, and which in turn was a division of application Ser. No. 460,929, filed June 3, 1965, and now abandoned.

This invention relates to foam-filled sheet products, and more particularly, it relates to compacted batting material of non-woven discontinuous fibers randomly oriented in a multidirectional pattern which is foam-filled to form a reinforced sheet of batting material. It also relates to a method and apparatus for forming the foam-filled sheet products.

Foam sheet products have been reinforced in many ways to give them added strength or other physical properties which the foam itself is incapable of providing. Most reinforcing techniques involve laminating reinforcing sheet materials to foam sheets; and one example of a reinforcement which is incorporated in a unitary flexible foam sheet is described in my Pat. No. 3,172,072. The products previously formed were lacking in that they did not form a sheet product with reinforcement uniformly distributed throughout the sheet so as to give a sheet product of resilient cellular material which is reinforced throughout its cross section. It is an object of this invention to provide a foam-filled sheet product which is stiffened by reinforcement throughout and is characterized by an increase in tensile strength in all directions parallel to the broad faces of the sheet, resistance to compression perpendicular to its broad faces, and increased overall puncture-resistance.

Broadly stated, the reinforced foam-filled sheet product is comprised of a compacted batting material of non-woven discontinuous fibers randomly oriented in a multidirectional pattern to define a sheet-like mass having a cross section of a multiplicity of spaced fibers expanded from their normal compacted positions away from each other in a direction toward the broad faces of the mass, and a unitary continuous cellular structure foam body foamed in situ within the batting material and holding the fibers in their expanded positions extending substantially homogeneously throughout the entire cross-sectional area of the sheet to form a reinforced foam-filled sheet of said baatting material. By expanding of the fibers is meant extension of the compacted fibers relative to each other and not longitudinal elongation of the individual fibers. The foam body is preferably a flexible polyurethane foam.

The method of preparing foam-filled sheet products of the character described consists of filling a compacted batting material of non-woven discontinuous fibers randomly oriented in a multidirectional pattern to define a sheet-like mass having a cross section of a multiplicity of fibers defining spaces therebetween with a foaming mixture in a substantially inactive state. The foaming mixture is expanded in situ within the batting material and the fibers are expanded away from each other in a direction toward the broad faces of the sheet being formed. The expanded foam is then cured to hold the fibers in their expanded position homogeneously throughout the entire cross-sectional area of the sheet. The method further involves compressing the compacted batting with the foaming mixture thereon and controlling the compression on the compressed foam so that its expansion is caused by the expanding foaming mixture rather than the inherent resiliency of the compacted batting and to performing the method in a continuous operation.

The apparatus is designed for use in foam making apparatus for continuously casting foam sheets along a moving surface which has feeding means for dispensing a foam mixture on the surface and metering means defining a nip through which the foam mixture is passed on the moving surface and metered to determine the ultimate thickness of the sheet and particularly is for use in forming a foam body within a compacted batting material of non-woven discontinuous fibers randomly oriented in a multidirectional pattern to define a cross section of a multiplicity of spaced fibers which can be fed through the metering means with the foaming mixture so that the batting material is compressed and filled with foam mixture, the improvement in the combination comprising a compression control device mounted adjacent the metering means to receive the carrier surface with the mixture-filled compressed batting as it emerges from the metering means, said device having means for maintaining sufficient pressure on the mixture-filled batting to prevent expansion of the batting but permitting expansion of the foam mixture while in said device so that the foam expands in situ within the batting material and permits expanding of the fibers away from each other in their normal compacted positions in a direction toward the broad faces of the sheet being formed, whereby the fibers in their expanded position extend substantially homogeneously throughout the entire cross-sectional area of the sheet.

A preferred embodiment of the apparatus, method and the product of the invention are described hereinbelow with reference to the drawings wherein:

FIG. 1 is an elevation partly in section and partly broken away of the apparatus of the invention;

FIG. 2 is an enlarged section of the apparatus of the invention taken at the metering rolls;

Figure 3:
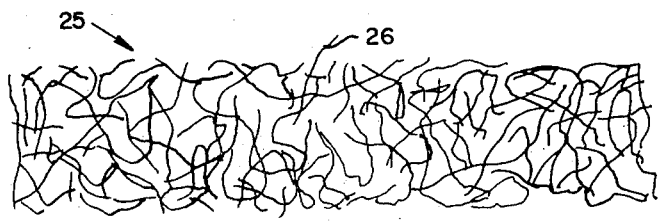
FIG. 3 is a section of the compacted batting material used in the product.

The plastic foam used in the practice of this invention is polyurethane foam which is formed from a polyisocyanate (especially toluene diisocyanate) and a hydroxyl-containing compound (eg., glycols, polyols, polyesters or polyethers). The particular composition of a given polyurethane foam varies widely depending upon the properties desired, such as density, tensile strength, flexibility, cell size and so on. Thus, the specific flexible foam set forth below is by way of example only.

In one example a pre-mixed resin is used comprising two component polyether-based prepolymer systems, eg., a prepolymer of toluene diisocyanate and an organic compound having two or more diisocyanate reactive groups, with an excess of toluene diisocyanate. (Such a resin is commercially available under the tradename Isofoam L–128 manufactured by Isocyanate Products, Inc. of Wilmington, Delaware). To about 100 parts by weight of this premixed resin is added 0.5 parts by weight of silicone oil, and this prepolymer mixture is placed in a reservoir and cooled to below 20°F. A catalyst mixture is then prepared and placed in a reservoir; this catalyst mixture comprises 1.0 parts by weight of N, N, N', N tetramethylbutane diamine and 0.5 parts of triethylene diamine dissolved in 2.3 parts by weight of distilled water.

The respective reactants are delivered continuously to a conventional mixing head 10 through lines 11 and 12 at accurately determined rates so that a proper mixture of prepolymer and catalyst is effected at the mixing head and discharged from the mixing head. The preparation of foam mixtures and the dispensing of them through a mixing head is within the knowledge of the art.

The mixing head 10 is supported by a suitable traversing mechanism, such as rollers 13 on tracks 14, so that it can be oscillated back and forth to spread foaming mixture across a continuous carrier belt 15. The carrier belt 15, which functions as a conveyor, is mounted to travel about an idler roll 16 positioned at the feed end of the apparatus and a drive roll 17 positioned at the discharge end of the apparatus. As the head indexes back and forth, the liquid polyurethane foaming mixture, at a temperature still too low to react, flows from its nozzle through a curved guide tube onto the carrier belt 15 which is moving at right angles to the traversing motion of the head. The upper surface of the carrier belt is coated with a release agent (such as silicone rubber, polyethylene, wax or polytetrafluoroethylene) and the web body behind this release agent may be woven fabric, thin sheet metal, or any other suitable flexible sheet.

After the stream of foaming mixture is dispensed on the carrier belt 15, the carrier belt enters between the nip of a pair of opposed metering rolls 19 and 20 which are advantageously coated with layers of rubber or other resilient material. The upper roll is also preferably mounted on an adjustable support 21 which permits the distance between its axis and the axis of the lower roll to be varied so that the nip between the roll can be adjusted from a wide gap to almost a zero setting.

As the carrier belt is drawn between the rolls 19 and 20, it comes in opposition with the underside of a covering web 22, which is shown as a length of paper coated with one of the release agents mentioned, but can also be a continuous belt if desired. The covering web is dispensed from a supply roll 23 mounted at the inlet end of the apparatus and is taken up by a drive roll 24 at the outlet end of the apparatus. The covering web 22 and the carrier belt 15 are thereby moved together through the apparatus in surface-to-surface opposition relative to each other.

It is to be noted that very little foaming mixture is allowed to pass between the nip of the rolls, for example a roll gap of about 0.020 inch will produce a sheet of ½ inch thick foam, and this should be taken into consideration in viewing the drawings which are not intended to be dimensionally accurate with respect to nip size and the like.

According to the invention, a sheet-like mass of compacted batting material 24 is positioned on the carrier belt and fed with the carrier belt beneath the head and through the nip of the metering rolls 19 and 20.

An example of the compacted batting material intended to be used is best described with reference to FIG. 3. This shows 15 denier rayon fiber, 60 grams/square yard formed into sheet form with light kneading prior to being fed into the machine, although it is contemplated that the sheet-like mass can advantageously be compacted immediately in front on the nip of the coils. The fibers can be cotton, nylon or most any material which will become compacted in the manner shown. In the example, each fiber 26 is a short or staple fiber or filament which is crimped so as to have a length much shorter than it would be if straight and the crimping is such that the fiber is bent along its length in multiple and random directions. The fibers 26 are compacted substantially to form a sheet of batting material of non-woven discontinuous individual fibers randomly oriented in a multidirectional pattern to define a cross section of a multiplicity of fibers defining spaces therebetween. Thus the compacted material is not a woven sheet and has little or no tensile strength in any direction. The fibers are merely loosely entangled, and they can be separated individually or the entire mass can be easily pulled apart. By kneading the fibers, they become more tightly entangled and the compacted batting material begins to acquire some tensile strength longitudinally only in the sense that it tends to stay in continuous sheet form when pulled longitudinally. Accordingly, a certain amount of kneading is a desirable feature for forming a sheet-like mass to facilitate feeding the compacted material in the manner shown in the drawing. It is important that there be a multiplicity of fibers within the cross-sectional thickness of the sheet and that they be so loosely compacted that they are freely separable from each other in a direction perpendicular to the broad surfaces of the sheet of compacted batting material. The importance is readily apparent from the next step in the method.

The foaming mixture is deposited in front of the metering rolls 19 and 20 as shown in FIG. 2 and a small rolling bank of mixture is built up so that there is a surplus always available 5o pass through the nip of the rolls. The spacing at the nip of the rolls is substantially less than the mean thickness of the sheet-like mass of the compacted batting material, and as the carrier belt travels through the nip of the roll, the compacted batting material 25 is substantially compressed so that all air is excluded and foaming mixture which is simultaneously carried into the nip of the rolls is squeezed into the compressed batting material to saturate it with foaming mixture in such a way that the chemicals are caused to be forced around and between each fiber homogeneously throughout the compressed batting material.

Positioned at the outlet end of the rolls is a compression control device 28. This device consists of rigid top and bottom plates 29 and 30, preferably steel, which are positioned over and under the covering web 22 and the carrier belt 15 respectively and determine the positioning of the web and belt. A manifold 31 is provided which is attached to a suitable air source and has a plurality of flexible hoses 32 and pipes 33 extending therefrom. The hoses 32 are attached to the top plate 29 and the pipes are attached to the bottom plate 30 at longitudinally spaced intervals. As shown in FIG. 2, the hoses are attached by means of hose fittings 34 and the pipes are attached by means of pipe fittings 35, each of which extends through the respective plates and opens into a recessed space 36 and 37 formed by cutting out a portion of the plate along the respective inner surfaces. The same effect can be realized by perforating the plate. Air is fed to the recessed spaces 36 and 37 at pressures of about 30 to 100 p.s.i. for the purpose of providing an air cushion or air lubrication effect between the respective plates 30 and 29 the movable carrier belt 15 and covering web 22. The bottom plate 30 is rigidly fastened to a supporting table and the top pate 29 is fastened so that it cannot move horizontally but is allowed to float in a vertical direction. Spaced above the top plate 29 is fixed pressure plate 38, and positioned between the fixed pressure plate and the top plate is in an air bag 39 into which air is fed by means of an inlet conduit 40 which extends through the pressure plate. The air bag 39 is a flexible bag which can hold air at a constant pressure.

The importance of this pressure control device is that it is a property of the compacted batting material that it will tend to return to its uncompressed condition even though it is saturated with the foaming mixture; should this occur, the liquid foaming mixture would adhere to the individual fibers and the spaces between the fibers which are characteristic of the compacted batting material would be formed by the expansion, and upon reaction of the chemical foaming mixture, gas generated by the reaction is free to escape the foaming chemical itself through the spaces and to be released to the atmosphere between the spaced mixture coated fibers. The gas would collect as large non-uniform gas pockets immediately under the chemical layer that is coated upon the bottom of the covering web 22 and the resulting product would be a fibrous mat in which most of the fibers are coated with unexpanded urethane chemicals and the top and bottom surfaces have a somewhat unexpanded skin of urethane chemicals which contain the escaped generated gases.

With the compression control device 28, as the compressed batting material 25 saturated with the foaming mixture emerges from the nip of the metering rolls 19 and 20, it becomes positioned between the plates 29 and 30 and maintained in the compressed position effected by the metering rolls. The air pressure bag 39 is controlled so that it just equals but does not exceed the pressure required to maintain the batting in the compressed position and thickness effected at the metering rolls. Air is fed through the hoses 32 and pipes 33 to effect an air cushion or lubrication between the plates 29 and 30 so that the covering web 22 and carrier belt 15 will slide freely between the plates with a substantial reduction of friction therebetween. As the chemicals begin to react to form foam, which occurs when there is a rise in temperature to a reactive state of the chemical foaming mixture, any gas generation is confined within the foaming mixture containing the compressed batting material. This gas generation, it is theorized, builds up a pressure which tends to unite with the pressure of the compressed fibers tending to expand to oppose the pressure exerted by the air bag 39. Since the pressure exerted by the air bag is only sufficient to compress the saturated batting material, this increase in pressure caused by the reaction of the foaming mixture will allow the foam to rise as though in free blow. This pressure will cause the top plate 29 to raise vertically with the expansion of foam and will become increasingly spaced from the bottom plate 30 as illustrated in FIG. 1. Because the batting is hold in a state of compression that is inversely proportional to the amount of expansion of foaming ingredients, all of the gas formation will be trapped within the liquid foaming mixture and will be substantially uniform and homogeneously distributed therein. It has been found that the amount of foaming mixture necessary to saturate the batting and coat the fibers, when reacted, forms a foam-filled sheet which has a larger cross-sectional thickness than that of the original thickness of the batting. This expansion in thickness is greatly aided by crimped fibers which have a tendency to straighten out under the forces of the expanding chemical mixture. At the exit end of the compression control device 28, the reaction is substantially completed and forms an irreversible gel which is self-supporting and has acquired its final thickness.

The foam-filled batting 40' thus formed is passed between the carrier belt 15 and the covering web 22 through an oven 41 which preferably contains three successive heating zones of progressive elevated temperatures of 125°, 180° and 245°F. respectively. The foam-filled batting 40' upon emerging from the oven 41 is semi-cured and non-tacky, and the covering web 22 is stripped off around roll 24 as is the carrier belt 15 around roll 17. The sheet of foam-filled batting is then conveyed by a conveyor mechanism 42 back into the oven 41 through a common series of festoon conveying means 42' to finally cure the product so that it can be fed from the oven 41 and wound into roll form on an end product roll 43.

Figure 4:
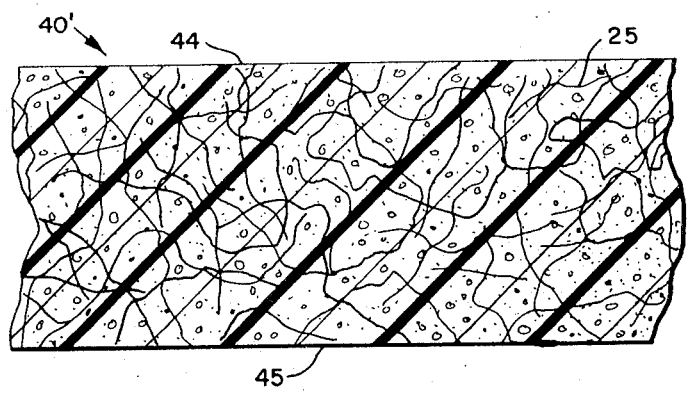
FIG. 4 is a section of the compacted batting material of FIG. 3 foam-filled according to the invention.

The foam-filled product 40' is shown in FIG. 4. It is characterized as a compacted batting material 25 of non-woven discontinuous fibers 26 which are clearly shown to be randomly oriented in a multidirectional pattern to define a cross section of a multiplicity of spaced fibers which are expanded from their normal compacted positions away from each other in a direction toward the broad faces 44 and 45 of the sheet. The foam-filled sheet also has a unitary continuous cellular structure foam body which is foamed in situ within the compacted fibers and holds them in their expanded positions extending substantially homogeneously throughout the entire cross-secti0nal area of the sheet to form a reinforced foam-filled sheet of batting material. Although the original batting material 25 possessed virtually no tensile strength and the flexible foam used in this example, when unreinforced, is easily stretchable in any direction parallel to the broad faces of the sheet and is easily compressed, the foam-filled sheet product formed is characterized by having an increase in tensile strength in all directions parallel to the broad faces of the sheet and is substantially non-extensible from its final sheet form; the sheet is also resistant to compression in a direction perpendicular to the broad faces of the sheet, and is characterized by a substantial increase in overall puncture-resistance as compared with either the sheet-like mass or foam sheet alone.

It is characteristic of foam formed in sheet form according to the method of the invention that the flat broad faces 44 and 45 of the sheet have a distinctive skin-like surface of relatively fine-pore structure as compared with the relatively coarse-pore internal structure throughout its thickness. This fine-pore structure is formed because the cellular structure at these broad faces is generated while in contact with the carrier belt and covering webs and thus cannot foam to the full porosity achieved elsewhere in the sheet. This gives a pleasant appearance and a good feel to the sheet product and also provides a surface which tends to resist the extension of ends of the fibers along the broad faces of the sheet.

I claim:

1. Apparatus for continuously casting foam sheets having reinforcing means along a moving carrier comprising means for feeding said reinforcing means for movement with said carrier, means for dispensing a foaming mixture on said reinforcing means supported by said carrier, means defining a nip through which said foam mixture and supporting reinforcing means is passed for dispersing substantially evenly said dispensed foam mixture over said reinforcing means and for metering substantially the ultimate thickness of said reinforced foam sheets, said sheet being defined by a foam body and said reinforcing means, said reinforcing means being of batting material having a substantially homogeneous cross-section of a multiplicity of spaced non-woven discontinuous fibers randomly oriented in a multidirectional pattern within said foam body, said batting material having a means thickness greater than the metered distance of said nip so that said batting material carrying said foaming mixture is compressed by said nip to compact the batting, express the air therefrom, and squeeze said foam mixture therein to saturate the same, and a compression control device mounted adjacent the metering means to receive the carrier and the mixture-filled compressed batting as it emerges from the dispersing and metering means, said device being of uninterrupted length from an entrance end to an exit end located at a point where the foam has been substantially completed, is self-supporting and has acquired its final thickness and including a top and bottom plate extending over and under said carrier and being substantially coextensive and uninterrupted from the entrance end to the exit end of the compression control device, each of said plates being fixed horizontally and one of said plates being freely movable vertically, and means for maintaining pressure on the mixture-filled batting throughout the area of said movable plate sufficient to prevent expansion of the batting but permitting expansion of the foam mixture while in said device so that the foam expands in situ within the batting material and permits extension of the fibers away from their normal compacted positions in a direction toward the broad faces of the sheet being formed whereby the fibers in their extended position are positioned substantially homogeneously throughout the entire cross-sectional area of the sheet.

2. Apparatus according to claim 1 including a covering web, means for moving said covering web through said compression control device, said foaming mixture being expanded between said moving carrier and covering web.

3. Apparatus according to claim 2 including air pressure means, said air pressure means extending through said top and bottom plate respectively to provide an air cushion between the respective plates and the moving carrier and covering web to reduce friction therebetween.

4. Apparatus according to claim 2 wherein said air pressure means includes an inflatable bag, said air pressure means being positioned above said top plate for equalizing the force of compressed batting tending to expand to its uncompressed position.

5. Apparatus according to claim 3 wherein said top and bottom plates provide at least one recess in the surface juxtaposed respectively to said covering web and carrier, said air pressure means being connected to each recess.

* * * * *